United States Patent
Morihira

(12) 
(10) Patent No.: US 6,361,438 B1
(45) Date of Patent: *Mar. 26, 2002

(54) VIDEO GAME TRANSPARENCY CONTROL SYSTEM FOR IMAGES

(75) Inventor: Shigeki Morihira, Amagasaki (JP)

(73) Assignee: Konami Co., Ltd., Kobe (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,511

(22) Filed: Jul. 24, 1998

(30) Foreign Application Priority Data

Jul. 25, 1997 (JP) ............................................. 9-200663

(51) Int. Cl.$^7$ ................................................ A63F 13/00
(52) U.S. Cl. ........................... 463/31; 463/32; 345/432; 345/473
(58) Field of Search ............................. 463/30, 31, 32, 463/33, 34; 345/418, 419, 420, 421, 422, 425, 426, 427, 429, 430, 431, 432, 433, 434, 435, 473, 474, 475

(56) References Cited

U.S. PATENT DOCUMENTS

| 5,415,549 A | 5/1995 | Logg | |
|---|---|---|---|
| 5,769,718 A | * 6/1998 | Reider | 463/31 |
| 5,947,823 A | * 9/1999 | Nimura | 463/32 |
| 5,973,704 A | * 10/1999 | Nishiumi et al. | 463/32 |
| 6,050,896 A | * 4/2000 | Hanado et al. | 463/32 |

FOREIGN PATENT DOCUMENTS

| JP | 8-315432 | 11/1996 |
|---|---|---|
| JP | 9-050541 | 2/1997 |
| JP | 9-299643 | 11/1997 |
| WO | WO 97/06511 | 2/1997 |
| WO | WO 97/16790 | 5/1997 |
| WO | WO 97/21194 | 6/1997 |

* cited by examiner

*Primary Examiner*—Michael O'Neill
(74) *Attorney, Agent, or Firm*—Jordan and Hamburg LLP

(57) ABSTRACT

When a player character moves closer to an opponent character, the viewpoint of a hypothetical camera which is capturing the image of the characters also moves closely to the characters, and a distance extractor determines the distance from the viewpoint of the hypothetical camera to an object model as an obstacle behind which one of the characters is concealed. Then, a transparency extractor obtains a transparency level corresponding to the determined distance from a transparency information table. Using the obtained transparency level, an image data processor generates image data of pixels of the object model, and combines the generated image data with image data of pixels of the character.

56 Claims, 9 Drawing Sheets

VIDEO GAME TRANSPARENCY CONTROL SYSTEM FOR IMAGES

BACKGROUND OF THE INVENTION

1. Field of the Invention

The present invention relates to a video game apparatus for playing an action video game such as a combat video game or a competitive video game such as a sports game in video game images displayed on a display screen which include game characters (competitive characters) movable in a pseudo-three-dimensional space containing object models of a pillar, a container, etc. as obstacles, a method of processing video game images in such a video game, and a computer-readable recording medium which stores a game program of such a video game.

2. Description of the Prior Art

Some video game apparatus display video game images on a display screen which represent a pseudo-three-dimensional space containing object models of pillars, obstacles, etc. When a combat video game, for example, is played on such a video game apparatus, a player character controlled by the game player and an opponent character controlled by the controller, including a CPU (Central Processing Unit), of the video game apparatus are displayed in the pseudo-three-dimensional space. In the displayed pseudo-three-dimensional space, the player character which moves in response to commands manually entered by the game player fights with the opponent character which is automatically moved by the controller according to a predetermined control program and control data. The game player controls the player character in an attempt to deliver an attacking action such as a kick or a punch from the player character to the opponent character in order to cause damage to the opponent character.

If the damage to the opponent character cannot be reduced below a certain level upon elapse of a predetermined time or the player character suffers damage beyond a certain level due to attacking actions such as kicks or punches from the opponent character, then the combat video game is over.

One problem with conventional combat video games is that when the viewpoint of a hypothetical camera is located at a certain position in the field of the pseudo-three-dimensional space, an object model such as a pillar in the field comes in front of the viewpoint of the hypothetical camera, concealing on the display screen important battle information of a game character which represents whether the game character is squatting or jumping.

According to a proposed solution, when the opponent character, for example, is positioned behind an object model such as a pillar, the object model is switched from an opaque rendition to a translucent rendition in its entirety, allowing the game player to see the opponent character through the translucent object model that overlaps the opponent character.

Since the object model changes from the opaque presentation to the translucent presentation when the opponent character is brought behind the object model, the game player is able to acquire desired information of the opponent character behind the object model. However, the game player who is viewing the displayed image feels somewhat strange and unnatural because the object model suddenly changes itself to the translucent appearance.

SUMMARY OF THE INVENTION

It is therefore an object of the present invention to provide a video game apparatus which is capable of allowing a game player to naturally acquire visual information of a game character positioned behind a displayed object model in a video game without causing the game player to feel strange and unnatural.

Another object of the present invention is to provide a method of processing video game images in such a video game.

Still another object of the present invention is to provide a computer-readable recording medium which stores a game program of such a video game.

According to the present invention, there is provided a video game apparatus for playing a video game in a game image displayed on a display screen and including a game character movable in a pseudo-three-dimensional space containing an object model. The video game apparatus has translucent information storage means for storing transparency levels of pixels of an object model which correspond to distances from the viewpoint of a hypothetical camera which is capturing an image of a game character, to the respective pixels of the object model, the transparency levels being higher as the distances are smaller, and transparency control means for determining distances from the viewpoint of the hypothetical camera to pixels of an object model as an obstacle behind which the game character is concealed as viewed from the viewpoint of the hypothetical camera, determining transparency levels corresponding to the determined distances, respectively, from the translucent information storage means, generating image data of the pixels of the object model as the obstacle based on the determined transparency levels, and combining the generated image data with image data of the game character.

Alternatively, in the above video game apparatus, the transparency control means may determine distances from the viewpoint of the hypothetical camera to pixels of an object model positioned forward of the game character as viewed from the viewpoint of the hypothetical camera, determine transparency levels corresponding to the determined distances, respectively, from the translucent information storage means, generate image data of the pixels of the object model based on the determined transparency levels, and combine the generated image data with image data of the game character.

Further alternatively, in the above video game apparatus, the transparency control means may determine distances from the viewpoint of the hypothetical camera to pixels of an object model if the object model is positioned closer than the game character to the viewpoint of the hypothetical camera, determine transparency levels corresponding to the determined distances, respectively, from the translucent information storage means, generate image data of the pixels of the object model as the obstacle based on the determined transparency levels, combine the generated image data with image data of the game character, and fog a color of the object model if the object model is positioned farther than the game character from the viewpoint of the hypothetical camera.

According to the present invention, there is also provided a method of processing a game image displayed on a display screen and including a game character movable in a pseudo-three-dimensional space containing an object model. The method comprises the steps of determining distances from the viewpoint of a hypothetical camera which is capturing an image of a game character to pixels of an object model as an obstacle behind which the game character is concealed as viewed from the viewpoint of the hypothetical camera, determining transparency levels corresponding to the determined distances, respectively, from a transparency information table, the transparency levels being higher as the distances are smaller, generating image data of the pixels of the object model based on the determined transparency levels, and combining the generated image data with image data of the game character.

Alternatively, in the above method, distances from the viewpoint of a hypothetical camera which is capturing an image of a game character to pixels of an object model positioned forward of the game character as viewed from the viewpoint of the hypothetical camera may be determined.

Further alternatively, in the above method, distances from the viewpoint of a hypothetical camera which is capturing an image of a game character to pixels of an object model may be determined if the object model is positioned closer than the game character to the viewpoint of the hypothetical camera, and a color of the object model may be fogged if the object model is positioned farther than the game character from the viewpoint of the hypothetical camera.

According to the present invention, there is also provided a computer-readable recording medium storing a control program for playing a video game in a game image displayed on a display screen and including a game character movable in a pseudo-three-dimensional space containing an object model. The control program comprises the steps of identifying an object model as an obstacle behind which a game character is concealed as viewed from the viewpoint of a hypothetical camera which is capturing an image of the game character, determining distances from the viewpoint of the hypothetical camera pixels of the object model, determining transparency levels corresponding to the determined distances, respectively, from a transparency information table, the transparency levels being higher as the distances are smaller, generating image data of the pixels of the object model based on the determined transparency levels, and combining the generated image data with image data of the game character.

Alternatively, in the above control program, an object model positioned forward of a game character as viewed from the viewpoint of a hypothetical camera which is capturing an image of the game character may be identified.

Further alternatively, in the above control program, distances from the viewpoint of a hypothetical camera which is capturing an image of a game character to pixels of an object model may be determined if the object model is positioned closer than the game character to the viewpoint of the hypothetical camera, and a color of the object model may be fogged if the object model is positioned farther than the game character from the viewpoint of the hypothetical camera.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Preferred embodiments of the present invention will be described below with respect to a combat video game in which a player character controlled by a game player and an opponent character controlled by a video game apparatus controller fight against each other in a pseudo-three-dimensional space displayed on a display screen.

1st Embodiment

Figure 1:
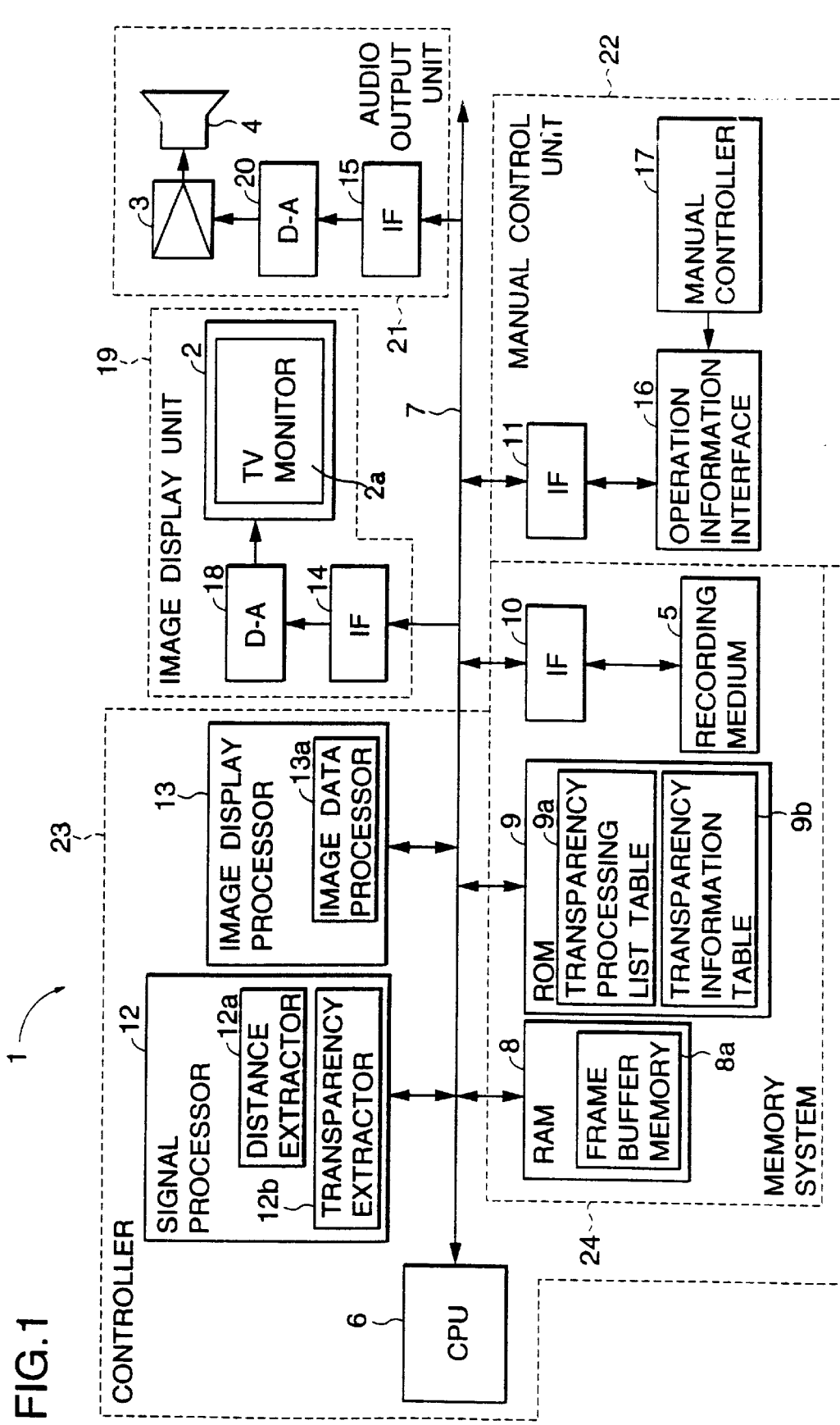
FIG. 1 is a block diagram of a video game apparatus according to a first embodiment of the present invention.

As shown in FIG. 1, a video game apparatus 1 according to a first embodiment of the present invention generally comprises an apparatus housing (not shown), a television monitor 2 for displaying video game images on its display screen 2a, an integrated amplifier 3 and a speaker 4 for radiating game sounds, and a computer-readable recording medium 5 which stores video game data including image data, audio data, and game program data. The computer-readable recording medium 5 may comprise a ROM which stores the video game data and game program data including an operating system, or a ROM cassette which comprises such a ROM and a plastic case housing the ROM, or an optical disk or a flexible disk.

The apparatus housing accommodates therein an operation and control system which comprises a CPU 6 for controlling various components, a bus 7 connected to the CPU 6 and comprising an address bus, a data bus, and a control bus, a RAM 8 connected to the bus 7 for temporarily storing various data, a ROM 9 connected to the bus 7 as a means for storing translucency information, interfaces 10, 11 connected to the bus 7, a signal processor 12 connected to the bus 7, an image display processor 13 connected to the bus 7, and interfaces 14, 15 connected to the bus 7.

The ROM 9 has a transparency processing list table 9a storing object models to be processed for transparency control, which are obstacles such as pillars, containers, etc. behind which a game character (competitive character) movable in a pseudo-three-dimensional space can be concealed, and a transparency information table 9b storing transparency levels of pixels (dots) of object models which correspond to the distances of the pixels to the viewpoint of a hypothetical camera which captures the image of the game character. The transparency levels are higher as the corresponding distances are smaller.

The signal processor 12 includes a distance extractor 12a and a transparency extractor 12b. The signal processor 12 primarily calculates the positions of game characters in a two-dimensional space, and generates and processes audio data. The signal processor 12 also causes the distance extractor 12a and the transparency extractor 12b to extract transparencies.

The image display processor 13 includes an image data processor 13a. Based on calculated results from the signal processor 12, the image display processor 13 stores image data to be displayed into a frame buffer memory 8a of the RAM 8. For effecting a transparency control process (described later on), the image display processor 13 stores image data to be processed by the transparency control process into the frame buffer memory 8a.

Therefore, the CPU 6 controls the signal processor 12 to effect various signal processing on the game data including image data, audio data, and game program data read from the recording medium 5. Based on the results of the signal processing, the CPU 6 also controls the image display processor 13 to store image data to be displayed and audio data to be reproduced into the frame buffer memory 8a.

The interface 14 connected to the bus 7 is connected to a D/A converter 18 which is connected to the television monitor 2. The interface 14, the DIA converter 18, and the television monitor 2 jointly make up an image display unit 19. The image data stored in the frame buffer memory 8a is supplied through the interface 14 and the DIA converter 18 to the television monitor 2, which displays game images on the display screen 2a based on the supplied image data.

The interface 15 connected to the bus 7 is connected to a D/A converter 20 which is connected to the integrated amplifier 3 connected to the speaker 4. The interface 15, the D/A converter 20, the integrated amplifier 3, and the speaker 4 jointly make up an audio output unit 21. The audio data stored in the frame buffer memory 8a is supplied through the interface 15, the D/A converter 20, and the integrated amplifier 3 to the speaker 4, which radiates game sounds based on the supplied audio data.

A manual controller 17 which is manually operable by the game player is connected through an operation information interface 16 which is connected through the interface 11 to the bus 7. The manual controller 17, the operation information interface 16, and the interface 11 jointly make up a manual control unit 22. When the game player operates the manual controller 16, the manual control unit 22 supplies commands to through the bus 7 to the CPU 6, which moves a player character displayed as an attentional character on the display screen 2a of the television monitor 2 as a video game proceeds.

The recording medium 5 is connected through the interface 10 to the bus 7. The CPU 6, the RAM 8, the ROM 9, the interface 10, the signal processor 12, and the image display processor 13 jointly make up a controller 23. In the controller 23, the CPU 6 reads the game data from the recording medium 5, controls the signal processor 12 to effect various signal processing on the game data, and also controls the image display processor 13 to store processed image and audio data into the frame buffer memory 8a. The recording medium 5, the RAM 8, the ROM 9, and the interface 10 jointly make up a memory system 24.

Figure 2:
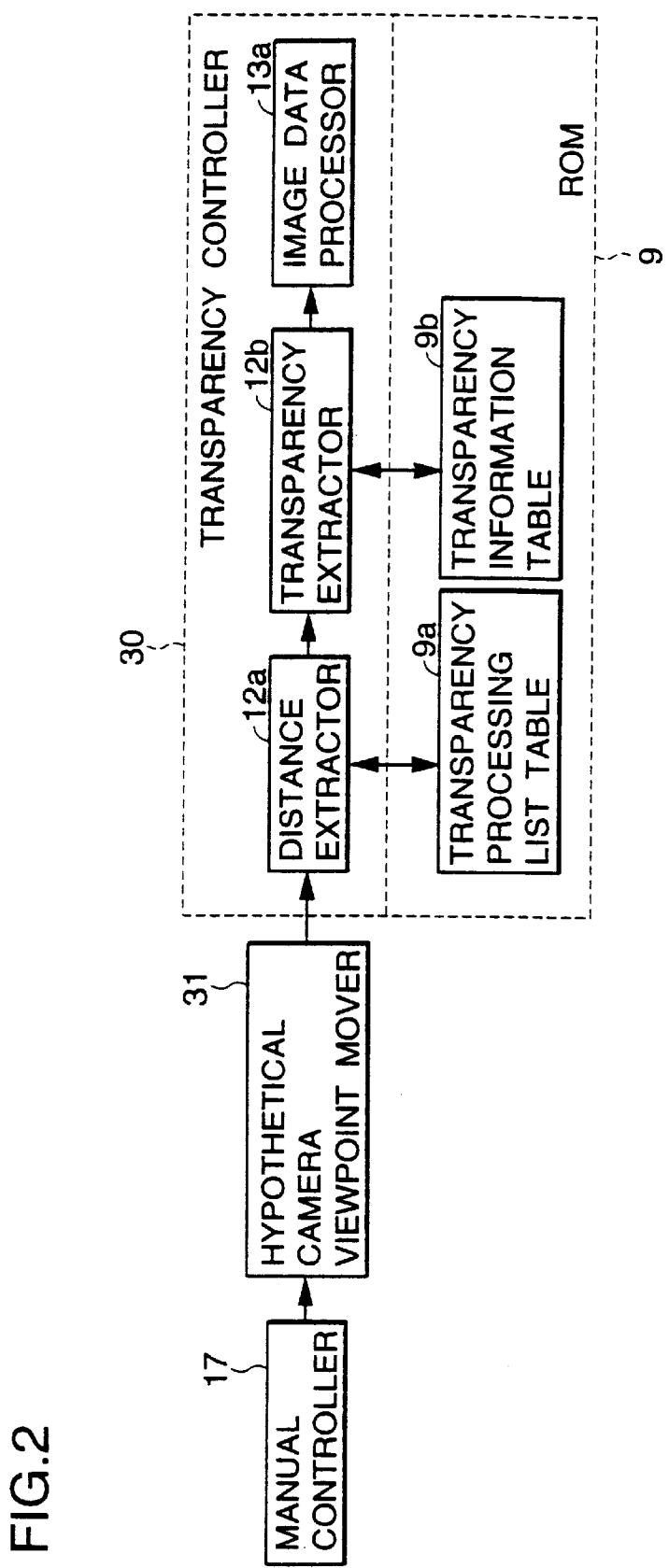
FIG. 2 is a block diagram of a functional arrangement for performing a transparency control process.

FIG. 2 shows in block form a functional arrangement for performing a transparency control process.

In FIG. 2, the CPU 6, which is part of a hypothetical camera viewpoint mover 31, controls the distance between competitive characters based on the game program in response to a character motion command supplied from the manual controller 17.

The CPU 6, the RAM 8, the signal processor 12, and the image display processor 13 jointly make up the hypothetical camera viewpoint mover 31. Based on a hypothetical camera viewpoint moving program of the game program, the CPU 6 controls the signal processor 12 and the image display processor 13 to generate image data representing that the viewpoint of the hypothetical camera moves toward the competitive characters as distance between the competitive characters becomes smaller, and the viewpoint of the hypothetical camera moves away from the competitive characters as distance between the competitive characters becomes greater, and stores the generated image data into the frame buffer memory 8a.

The distance extractor 12a, the transparency extractor 12b, and the image data processor 13a jointly make up a transparency controller 30. When a game character movably displayed in a pseudo-three-dimensional space on the display screen 2a of the television monitor 2 is concealed behind an object model in the pseudo-three-dimensional space during a video game, the transparency controller 30 determines the distance from the viewpoint of the hypothetical camera which is capturing the image of the game character to the intervening object model, determines a transparency level corresponding the determined distance from the transparency information table 9b, acquires image data of the object model based on the determined transparency level, and combines the acquired image data with the image data of the game character which has already been stored in the frame buffer memory 8a according to a hidden-surface removal process. This process is referred to as the transparency control process.

Specifically, the distance extractor 12a determines distances from the viewpoint of the hypothetical camera which is capturing the image of the game character to pixels of the object model stored in the transparency processing list table 9a, behind which the game character is concealed. The transparency extractor 12b extracts transparency levels corresponding to the distances determined by the distance extractor 12a from the transparency information table 9b. The image data processor 13a acquires image data of the pixels of the object model using the transparency levels extracted by the transparency extractor 12b, and combines the acquired image data with image data of pixels of the game character which underlies the object.

A specific example of functions performed by the transparency controller 30 will be described below.

First, a basic process of moving the viewpoint of the hypothetical camera will be described below. This process serves to keep competitive characters displayed on the display screen 2a (see also FIG. 7) at all times during a video game and to show details of the fight between the competitive characters. Specifically, when the competitive characters move away from each other, the hypothetical camera zooms out, i.e., its viewpoint moves away from the competitive characters which are being displayed in respective left and right positions on the display screen 2a, and when the competitive characters move toward each other, the hypothetical camera zooms in, i.e., its viewpoint moves toward the competitive characters which are being displayed in respective left and right positions on the display screen 2a. At this time, part of the body of each of the competitive characters, e.g., the waist or head, is used as a reference to determine the position of the competitive characters.

The distances from the viewpoint of the hypothetical camera to pixels of an object model behind which a game character is concealed vary as the viewpoint of the hypothetical camera moves toward or away from the competitive characters depending on the distance between the competitive characters which is controlled by the manual controller 17. For example, when the competitive characters move toward each other in order to engage in a combat fight, the viewpoint of the hypothetical camera moves toward the competitive characters, and when at least one of the competitive characters moves away from the other in order to avoid an attack waged by the other, the viewpoint of the hypothetical camera moves away from the competitive characters so that the competitive characters will stay displayed on the display screen 2a. The distance between the competitive characters varies as the game player manually operates the manual controller 17 to move the player character. As the distance between the competitive characters thus varies, the distance between the viewpoint of the hypothetical camera and the object model which acts as an obstacle to the hypothetical camera also varies. The transparencies of the respective pixels of the object model then vary depending on the distance between the viewpoint of the hypothetical camera and the object model.

In the combat game in which the two competitive characters fight against each other while moving in the pseudo-three-dimensional space, the viewpoint of the hypothetical camera moves depending on the movement of the competitive characters in order to view the competitive characters laterally at all times, so that one of the competitive characters is displayed in a right position on the display screen 2a and the other in a left position on the display screen 2a. This viewing setup allows the game player to maneuver the player character and judge the combat situation with ease. Since the viewpoint of the hypothetical camera moves depending on the movement of the competitive characters, an object model tends to be positioned as an obstacle between the competitive characters and the viewpoint of the hypothetical camera. Therefore, the above transparency control process is carried out to change the transparency of the intervening object model through successive transparency levels or continuously. It is the usual practice to position the center of the viewpoint of the hypothetical camera intermediate between the competitive characters in view of providing a well balanced layout of displayed objects in the displayed images.

The basic process of moving the viewpoint of the hypothetical camera has been described above. While there are several other additional processes of moving the viewpoint of the hypothetical camera, the viewpoint of the hypothetical camera is basically moved in a manner to display the player character in a natural looking manner on the display screen 2a so that the game player can maneuver the player character with utmost ease.

Obstacles such as pillars, containers, etc. are positioned as object models in the pseudo-three-dimensional space in which the game characters are movable. Those obstacles may cause the game characters to change their actions, and the game characters may use those obstacles to take certain actions, e.g., a triangular jump using a wall of an obstacle. Basically, however, movement of the viewpoint of the hypothetical camera is not varied by obstacles. This is because if the positions of object models were taken into account in moving the viewpoint of the hypothetical camera, then it would likely for the game player to fail to view both the competitive characters properly depending on the viewpoint of the hypothetical camera, and the game player would possibly find it difficult to issue a command for the player character to attack the opponent character.

A color fogging process as a basis for performing the functions of the transparency controller 30 will be described below.

According to the color fogging process, the distance between an object model such as a background or a floor displayed on the display screen and the viewpoint of the hypothetical camera is calculated, and a color mixing ratio for a designated color is established depending on the calculated distance. Then, the color of the object model is mixed with the designated color at the established color mixing ratio for thereby making the object model look like a fogged object. For fogging a background, for example, displayed on the display screen, the color of the object model may progressively approach the designated color as the object model becomes farther from the viewpoint of the hypothetical camera, or alternatively, the color of the object model may progressively approach the designated color as the object model becomes closer to the viewpoint of the hypothetical camera. The color fogging process may be effected with respect to not only each polygon surface, but also each pixel in a polygon surface for changing the color of the pixel depending on the distance from the viewpoint of the hypothetical camera to the pixel, so that the polygon can be rendered in more natural colors.

The functions of the transparency controller 30, i.e., the transparency control process, can be performed on the basis of the above principles of the color fogging process. Specifically, the transparency of an object model can be changed depending on the distance from the viewpoint of the hypothetical camera to the object model, e.g., the transparency of an object model can be lowered as the distance from the viewpoint of the hypothetical camera to the object model becomes greater. This process is referred to as a translucent fogging process. According to the translucent fogging process, color data of pixels of a game character and color data of pixels of an object model are mixed together at a predetermined ratio, so that an image including the game character positioned behind the model object can be seen through the model object. According to the first embodiment, there are 256 transparency levels available for object models to be displayed on the display screen. These 256 transparency levels look continuous to the eye when displayed on the display screen. The translucent fogging process is applicable to not only each polygon surface, but also each pixel in a polygon surface for changing the transparency of the pixel depending on the distance from the viewpoint of the hypothetical camera to the pixel, so that each pixel can be controlled in transparency. The transparency can be controlled using various system numerical values as parameters, e.g., texture color data.

With the translucent fogging process being employed, the transparency controller 30 can be implemented by a hardware arrangement which is capable of displaying three-dimensional polygons with texture mapping. Specifically, the transparency of an object model as an object to be displayed is determined, then image data of pixels of the object model is acquired using the determined transparency, and the acquired image data is combined with the image data of a game character, behind the object model, which has already been stored in the frame buffer memory 8a according to a hidden-surface removal process, after which the combined image data is stored pixel by pixel in the frame buffer memory 8a. It is not necessary to decide whether the object model and the game character overlap each other or not. Consequently, an object model which overlaps a game character can be displayed translucently according to the translucent fogging process.

According to the translucent fogging process, an obstacle displayed in front of a game character moving in the pseudo-three-dimensional space as viewed from the hypothetical camera is made translucent at a transparent level depending on how close the viewpoint of the hypothetical camera is to the obstacle, thus preventing the game character from being concealed by the obstacle. When the transparency controller 30 is implemented by the above hardware arrangement, the translucent fogging process can be performed efficiently in terms of software-implemented processing without imposing too much burden on the CPU 6. Images displayed on the display screen according to the translucent fogging process can be viewed naturally by the game player. Since the obstacle in front of the game character is translucent, the viewpoint of the hypothetical camera can be moved without concern over the presence of the obstacle, and the game player can easily recognize the combat situation for the game character and hence can maneuver the game character easily for fighting against the opponent character.

In the translucent fogging process, a parameter is set, as described below, to carry out the transparency control process in a predetermined attentional range between an object model and the viewpoint of the hypothetical camera for preventing a game character behind the object model from being concealed from view depending on the distance between the competitive characters.

Figure 3:
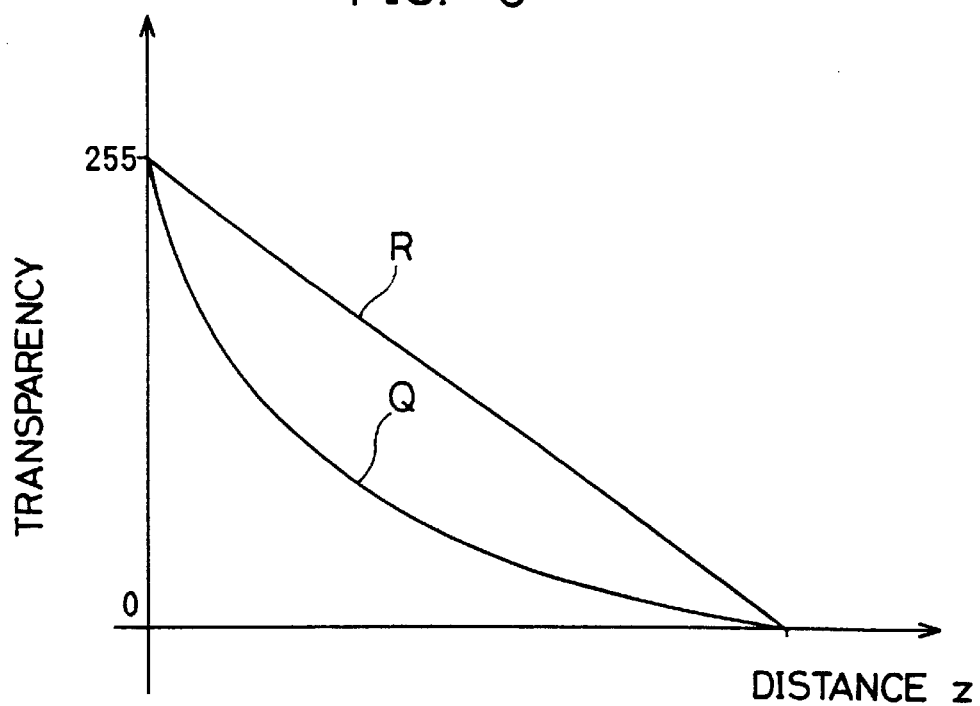
FIG. 3 is a diagram showing a transparency coefficient curve in the transparency control process.

In the transparency control process, the transparency of an object model overlapping a game character is lower as the object model is farther from the viewpoint of the hypothetical camera. As shown in FIG. 3, the transparency can vary through 256 transparent levels ranging from levels "0" to "255" along a hyperbolic transparency coefficient curve Q depending on the distance z from the viewpoint of the hypothetical camera to the object model along a Z-axis direction normal to the display screen 2a. Specifically, the transparency decreases hyperbolically as the distance z increases. Alternatively, the transparency may decrease linearly along a linear along transparency coefficient curve R as the distance z increases.

Figure 4:
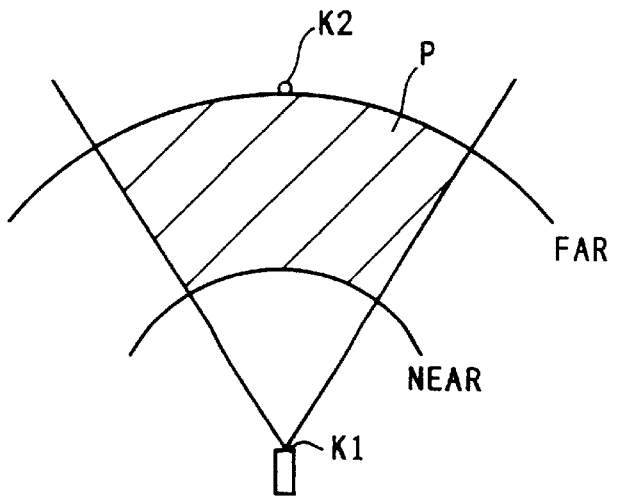
FIG. 4 is a diagram showing a transparency control processing range in the transparency control process.

In FIG. 4, the viewpoint of the hypothetical camera is located at a position K1, and a game character is located at a position K2. When an object model is positioned farther than the position K2 from the position K1, the transparency control process is canceled, making the object model fully opaque.

Specifically, the parameter in the translucent fogging process is set to a value in a transparency control range P shown hatched in FIG. 4, which lies between a boundary FAR where an object model looks fully opaque and a boundary NEAR where an object model has the maximum transparency. In the transparency control range P, FAR>NEAR. In FIG. 4, the position K2 of the game character is located on the boundary FAR, and the boundary NEAR is located between the boundary FAR and the position K1. Therefore, when the object model is positioned farther than the position K2 from the position K1, the transparency control process is canceled.

The translucent fogging process is similar to the color fogging process except that the transparency of the object model, rather than the color of the object model, is modulated The modulated transparency, represented by OUT, is calculated from original color data, represented by A, of the object model and a parameter, represented by FOG, in the translucent fogging process as follows:

$$OUT = A \times FOG$$

A corrective value ADJ is further added to the modulated transparency OUT, producing a final modulated transparency OUT', as follows:

$$OUT' = A \times FOG + ADJ$$

The final modulated transparency OUT' thus calculated prevents the object model from becoming fully transparent even if its transparency is maximum This is because the video game can be played more smoothly when the object model is displayed as an obscure image and can be confirmed for its position even though its transparency is maximum.

When the viewpoint of the hypothetical camera moves toward the object model into the transparency control range P beyond the boundary NEAR, the transparency of the object model increases stepwise through the 256 levels, continuously to the eye, so that the object model changes from an opaque rendition to a translucent rendition and then to a transparent rendition.

Figure 5:
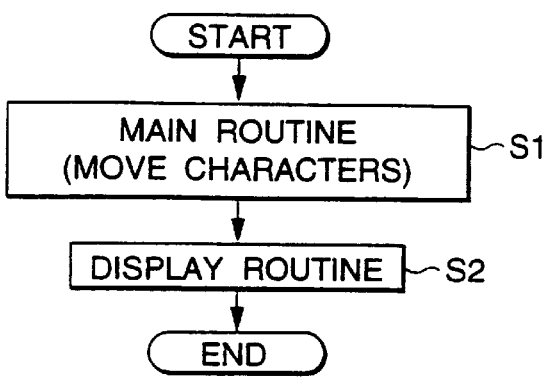
FIG. 5 is a flowchart of a main routine and a display routine of the video game apparatus for playing a video game.

FIG. 5 shows a main routine and a display routine of the video game apparatus for playing a video game.

In the main routine in step S1, the CPU 6 controls various parts of the video game apparatus to move competitive characters in a pseudo-three-dimensional space containing object models as obstacles based on the game program and commands supplied from the manual controller 17. In the next display routine in step S2, a game image is displayed on the display screen 2a of the television monitor 2.

Figure 6:
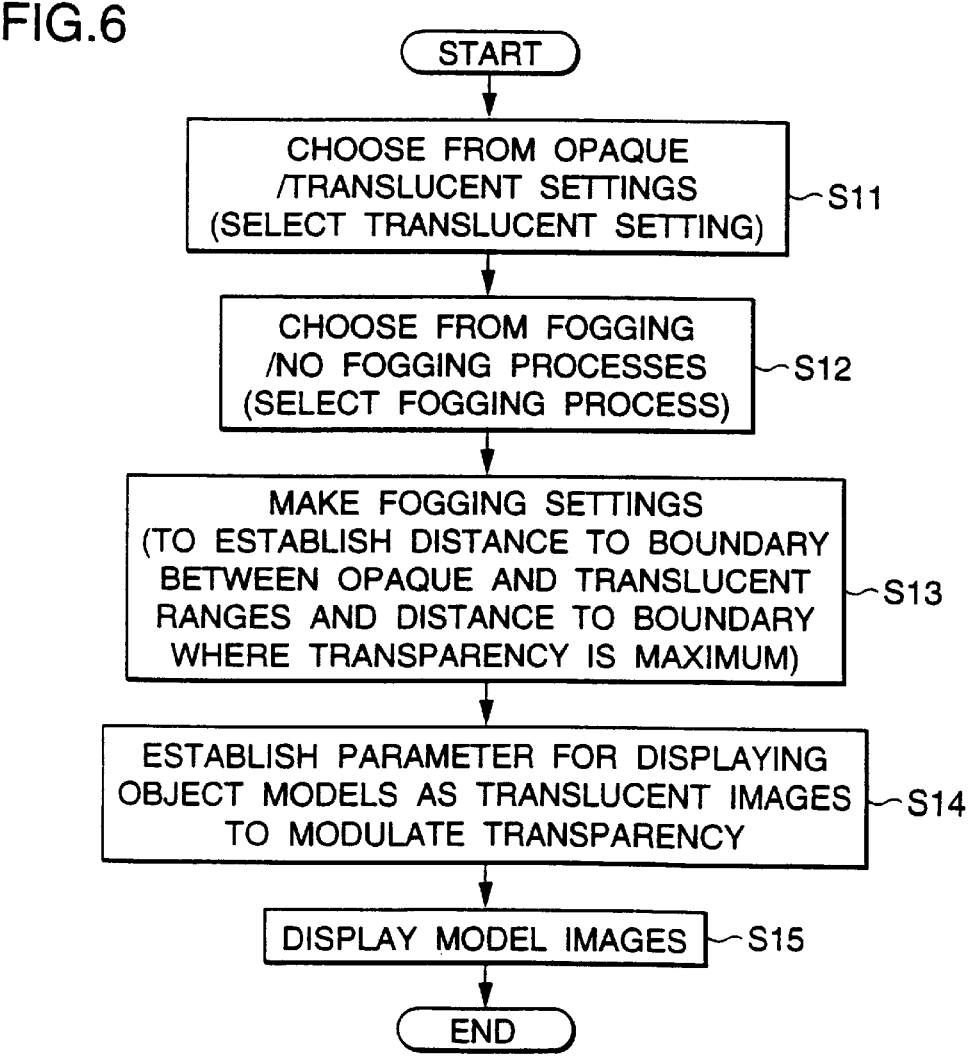
FIG. 6 is a flowchart of a transparency control process routine.

FIG. 6 shows a transparency control process routine.

In the transparency control process routine, a translucent setting is first selected from a choice of opaque/translucent settings in step S11. Then, a fogging process is selected from a choice of fogging/no fogging processes in step S12. Thereafter, fogging settings are made to establish the distance up to a boundary between opaque and translucent ranges and the distance up to a boundary where the transparency is maximum, in step S13. Then, a parameter for displaying object models as translucent images in order to modulate the transparency is established instep S14.

Using the settings established in steps S11–S14, model images in the transparency control process are displayed on the display screen 2a of the television monitor 2 in step S15. The displayed model images are game images of a combat video game as shown in FIGS. 7 through 10.

Figure 7:
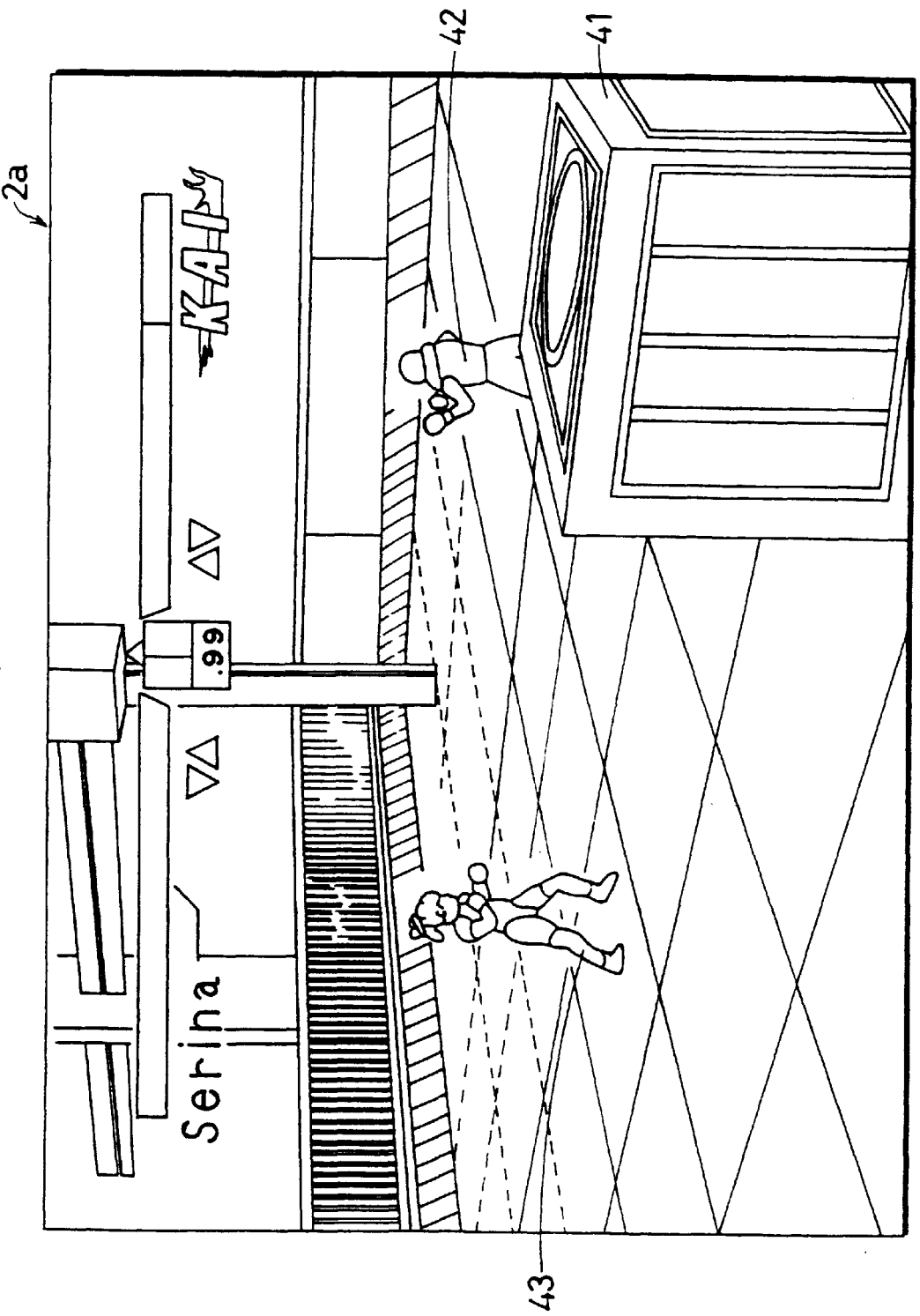
FIG. 7 is a view of a video game image displayed on a television monitor of the video game apparatus shown in FIG. 1, the view showing an obstacle in an opaque rendition.

As shown in FIG. 7, a pseudo-three-dimensional space containing a container 41 as an object model which is an obstacle is displayed on the display screen 2a, the pseudo-three-dimensional space representing a space on the top of a building, for example. An opponent character 42 which is controlled by the controller 23 and a player character 43 which is controlled by the manual controller 17 operated by the game player are also displayed in the pseudo-three-dimensional space on the display screen 2a. In FIG. 7, the opponent character 42 and the player character 43 are spaced from each other after having made offensive and defensive actions. At this time, the lower part of the opponent character 42 is positioned behind and concealed by the container 41, as viewed from the viewpoint of the hypothetical camera.

When the game player issues a character motion command from the manual controller 17 to the CPU 6 to move the player character 43 to the opponent character 42 in order to attack the opponent character 42, the CPU 6 controls the player character 43 to move to the opponent character 42 based on the game program according to the supplied character motion command. The player character 43 as it moves to the opponent character 42 is now displayed on the display screen 2a. At the same time, the CPU 6 controls the signal processor 12 and the image display processor 13 based on the hypothetical camera viewpoint moving program of the game program to move the viewpoint of the hypothetical camera toward the characters 42, 43 as the distance between the characters 42, 43 becomes smaller. Therefore, the characters 42, 43 as they get closer to each other and to the viewpoint of the hypothetical camera are displayed on the display screen 2a.

When the player character 43 moves closer to the opponent character 42 and comes into the transparency control range P beyond the boundary FAR, the distance extractor 12a determines the distances from the viewpoint of the hypothetical camera to pixels of the container 41 stored in the transparency processing list table 9a. The transparency extractor 12b extracts transparency levels corresponding to the distances determined by the distance extractor 12a from the transparency information table 9b. The image data processor 13a acquires image data of the pixels of the container 41 using the transparency levels extracted by the transparency extractor 12b, and combines the acquired image data with image data of pixels of the opponent character 42 which underlies the container 41.

Figure 8:
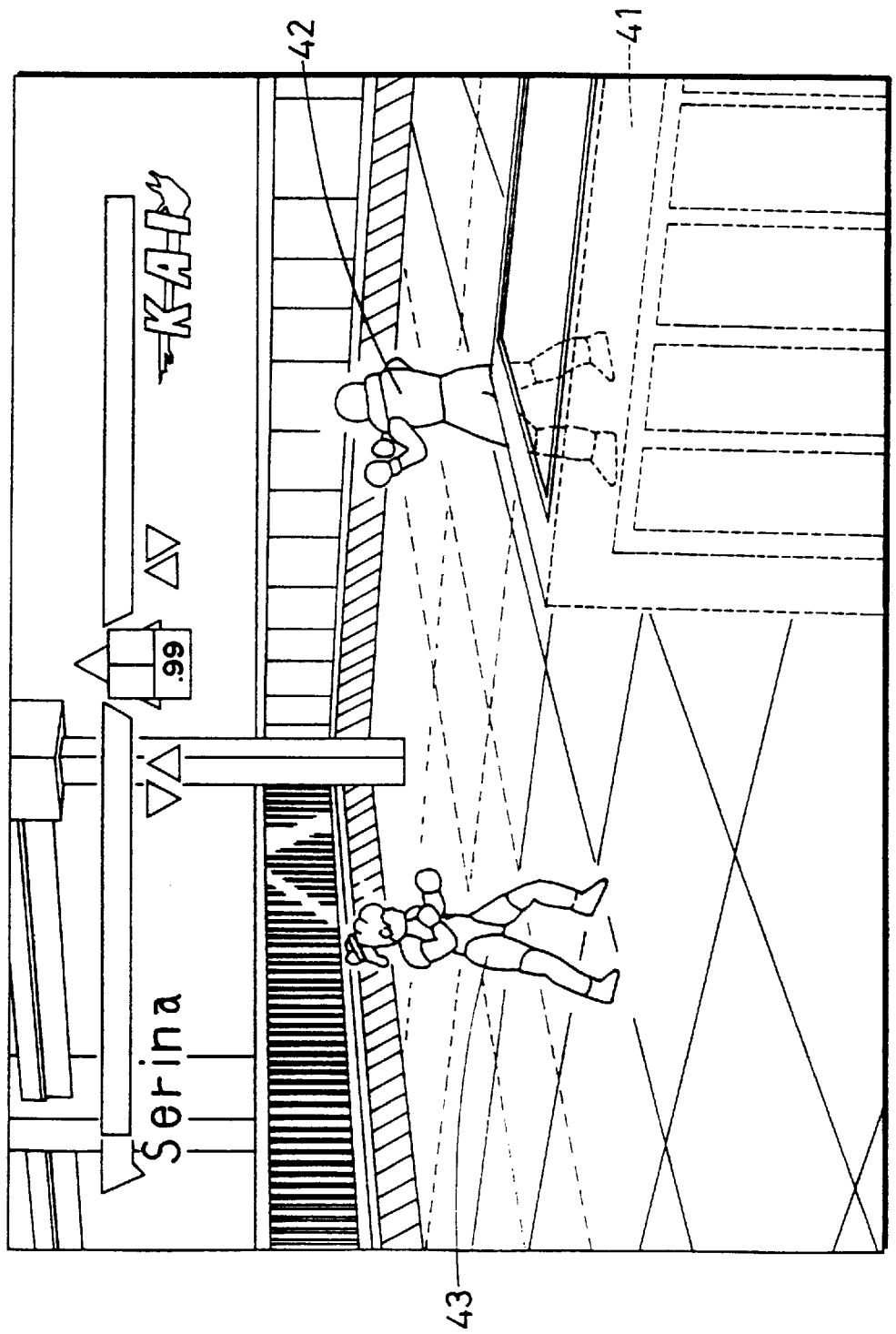
FIG. 8 is a view of a video game image displayed on a television monitor of the video game apparatus shown in FIG. 1, the view showing an obstacle in a slightly translucent rendition.

As a result, as shown in FIG. 8, the container 41 is displayed in a slightly translucent rendition, showing obscure legs of the opponent character 42 therethrough. The thighs of the opponent character 42 are not visible because pixels of an upper portion of the container 41 which overlaps the thighs of the opponent character 42 are remoter from the viewpoint of the hypothetical camera and hence less transparent than the rest of the container 41. This is because the transparency control process is carried out on each pixel, not each polygon surface, of object models.

As the player character 43 moves closer to the opponent character 42, the viewpoint of the hypothetical camera also moves toward the characters 42, 43. The distance extractor 12a then determines the distance from the viewpoint of the hypothetical camera to the container 41. The transparency extractor 12b extracts a higher transparency level corresponding to the distance determined by the distance extractor 12a from the transparency information table 9b. Using the extracted higher transparency level, the image data processor 13a acquires image data of the container 41, and combines the acquired image data with image data of the opponent character 42 which underlies the container 41.

Figure 9:
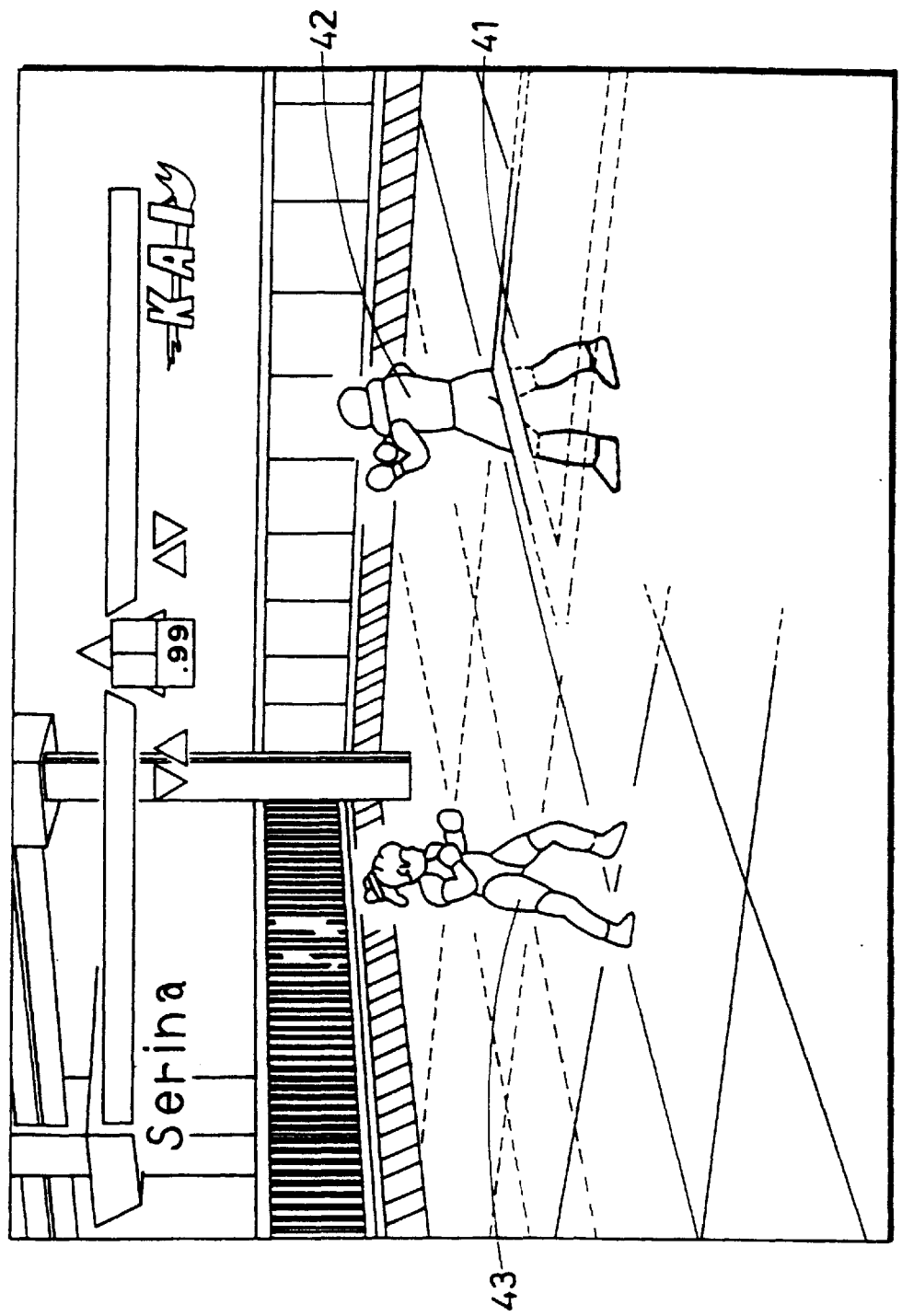
FIG. 9 is a view of a video game image displayed on a television monitor of the video game apparatus shown in FIG. 1, the view showing an obstacle in a medianly translucent rendition.

At this time, as shown in FIG. 9, the container 41 is displayed in a medianly translucent rendition, showing the thighs and legs and of the opponent character 42 therethrough. Part of the thighs of the opponent character 42 is not visible because pixels of an upper portion of the container 41 which overlaps the part of the thighs of the opponent character 42 are remoter from the viewpoint of the hypothetical camera and hence less transparent than the rest of the container 41.

Upon further movement of the player character 43 closer to the opponent character 42 beyond the boundary NEAR, the viewpoint of the hypothetical camera further moves toward the characters 42, 43. The distance extractor 12a then determines the distance from the viewpoint of the hypothetical camera to the container 41. The transparency extractor 12b extracts a higher transparency level corresponding to the distance determined by the distance extractor 12a from the transparency information table 9b. Using the extracted higher transparency level, the image data processor 13a acquires image data of the container 41, and combines the acquired image data with image data of the opponent character 42 which underlies the container 41.

Figure 10:
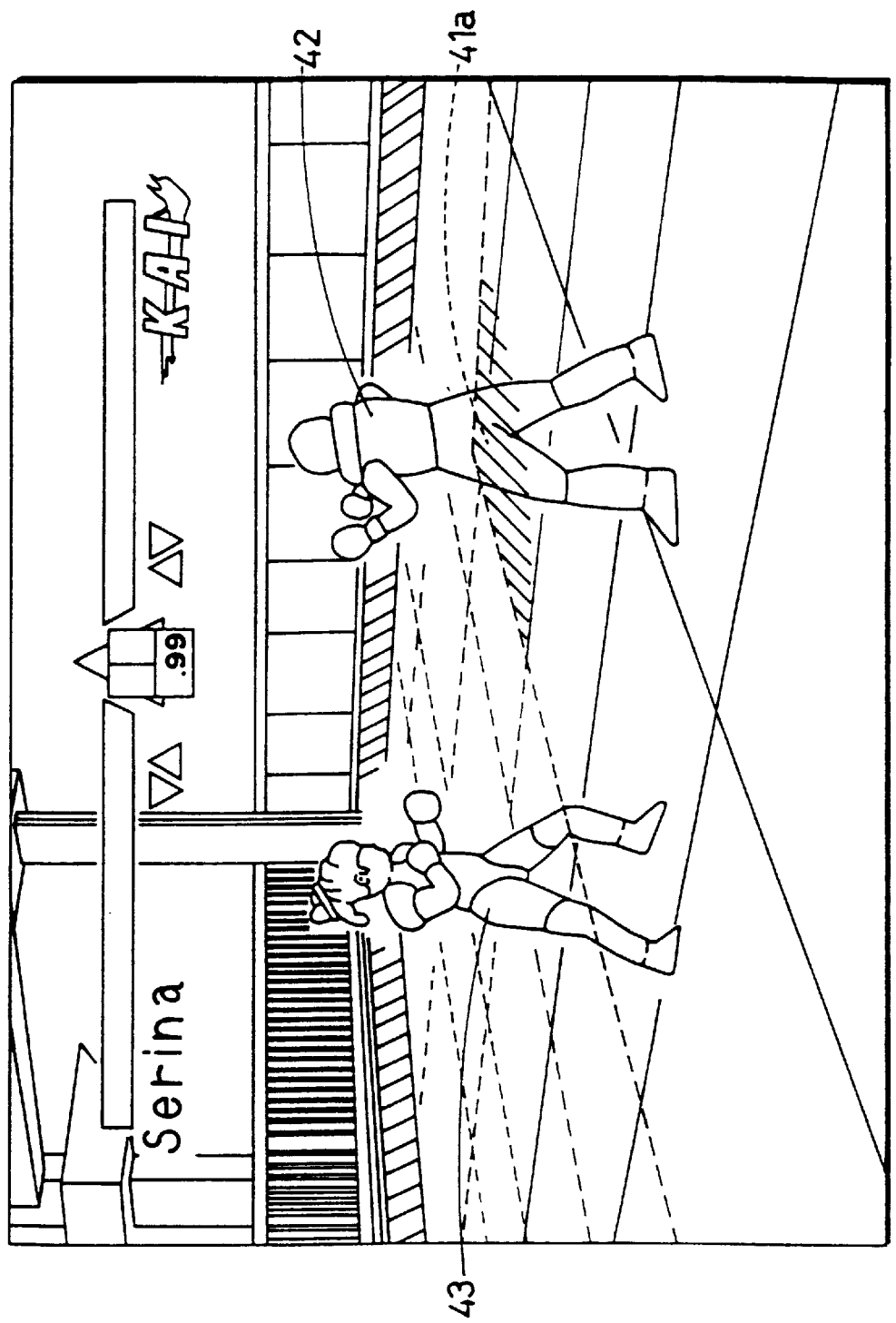
FIG. 10 is a view of a video game image displayed on a television monitor of the video game apparatus shown in FIG. 1, the view showing an obstacle in a maximally transparent rendition.

At this time, as shown in FIG. 10, the container 41 is displayed in a maximally transparent rendition. However, since the corrective value ADJ is added to the transparency of the container 41, the container 41 is not fully translucent though its transparency is maximum, so that the container 41 can visually be confirmed for its existence. As indicated by a hatched region 41a of the container 41, a portion of the container 41 remains slightly translucent over the opponent character 42.

According to the first embodiment, as described above, when the game player sends a command to reduce the distance between the game characters from the manual controller 17 to the hypothetical camera viewpoint mover 31, the viewpoint of the hypothetical camera is moved toward the game characters. Because the transparencies of the pixels of an object model as an obstacle to the viewpoint of the hypothetical camera become higher as the distance from the viewpoint of the hypothetical camera to the pixels of the object model becomes smaller, when the viewpoint of the hypothetical camera is moved toward the object model, the transparencies of the pixels of the object model increase from the translucent rendition in a three-dimensional perspective, allowing one of the game characters behind the object model to be seen through the object model. Consequently, the game player can acquire visual information of the game character behind the object model naturally without feeling strange, and hence can play the video game smoothly.

As the distances from the viewpoint of the hypothetical camera to the pixels of the object model overlapping the game character are reduced, the transparencies of the pixels of the object model increase. An object model which is farther than the game character from the viewpoint of the hypothetical camera remains opaque. This transparency control process offers the following advantage: When a game character enters a hole in a castle and the viewpoint of the hypothetical camera moves toward a castle wall on one side of the hole, a castle wall on the opposite side of the hole remains opaque, and the transparency of the castle wall overlapping the game character increases in a three-dimensional environment, for thereby allowing the game player to be seen through the castle wall. As a result, the game player can obtain visual information of the game character in the hole naturally without feeling strange, and hence can play the video game smoothly.

The transparency control process is thus effected on each pixel of an object model and controls its transparency in terms of the depth of the object model As the viewpoint of the hypothetical camera approaches an object model, the transparency of the object model progressively increases, permitting a game character behind the object model to be seen progressively clearly through the object model. Thus, the game player can visually recognize the game character behind the object model, and hence can play the video game without fail.

The transparency control process is limited to certain object models, and not applied to thin objects such as bars and grids, inherently transparent objects such as glass panels, and other objects such as floors and background objects which do not need to be made transparent. As a consequence, the burden on the controller 23 for executing the transparency control process is relatively small.

2nd Embodiment

In the first embodiment, the transparency control process is effected in a three-dimensional environment on pixels of an object model which is an obstacle concealing a game character as viewed from the viewpoint of the hypothetical camera which is capturing an image of the game character, and as the viewpoint of the hypothetical camera moves toward the object model, the transparency of the object model progressively increases a natural looking manner to allow the game character behind the object model to be seen through the object model. According to a second embodiment of the present invention, the transparency control process is effected in a three-dimensional environment on pixels of any object model which is positioned closer to the viewpoint of the hypothetical camera than a game character, not just an object model which is an obstacle concealing a game character as viewed from the viewpoint of the hypothetical camera, and as the viewpoint of the hypothetical camera moves toward the object model, the transparency of the object model progressively increases naturally to allow the game character behind the object model to be seen through the object model. As a result, as with the first embodiment, an object model which is an obstacle concealing a game character as viewed from the viewpoint of the hypothetical camera which is capturing an image of the game character is subject to the transparency control process on a pixel basis in a three-dimensional environment. In addition, insofar as the transparency control range P extends in the Z-axis direction normal to the display screen 2$a$, any object model which is positioned closer to the viewpoint of the hypothetical camera than the game character is also subject to the transparency control process on a pixel basis in a three-dimensional environment.

The transparency control process according to the second embodiment is combined with the color fogging process as follows:

Since the transparency control process, i.e., the translucent fogging process, is based on the ordinary fogging process (color fogging process), when the translucent fogging process is executed, the color fogging process cannot simultaneously be executed. In order to execute the color fogging process in combination with the translucent fogging process, switching needs to be made between the translucent fogging process and the color fogging process according to a software approach.

Actually, the translucent fogging process is required for an object model that is positioned very closely to the viewpoint of the hypothetical camera, and the color fogging process is usually effected on an object model such as a background object which is positioned far from the viewpoint of the hypothetical camera. There are not actual instances where both the translucent fogging process and the color fogging process are simultaneously performed. By switching between the translucent fogging process and the color fogging process, however, it is possible to display object models subjected to these processes apparently simultaneously on the display screen 2$a$.

Switching is made between the translucent fogging process and the color fogging process according to the following conditions 1, 2:

1. The color fogging process is performed on an object model that is farther than the competitive characters from the viewpoint of the hypothetical camera. Stated otherwise, the translucent fogging process does not need to be effected on any object model that is farther than the competitive characters from the viewpoint of the hypothetical camera because such an object model does not conceal the competitive characters.

2. The color fogging process is performed on an object model that is farther from the viewpoint of the hypothetical camera than a position where an object model would be made opaque by the translucent fogging process, i.e., behind the competitive characters.

This switching capability is effective in reducing the number of displayed object models that are made translucent. Specifically, if the translucent fogging process were effected on all object models, then any object model whose transparency is zero and which is opaque to the eye would also be made translucent. In the color fogging process, however, an opaque setting can be made for any object model whose transparency is zero and which is opaque to the eye. Accordingly, the number of displayed object models that are made translucent can be reduced by combining the translucent fogging process and the color fogging process with each other.

Figure 11:
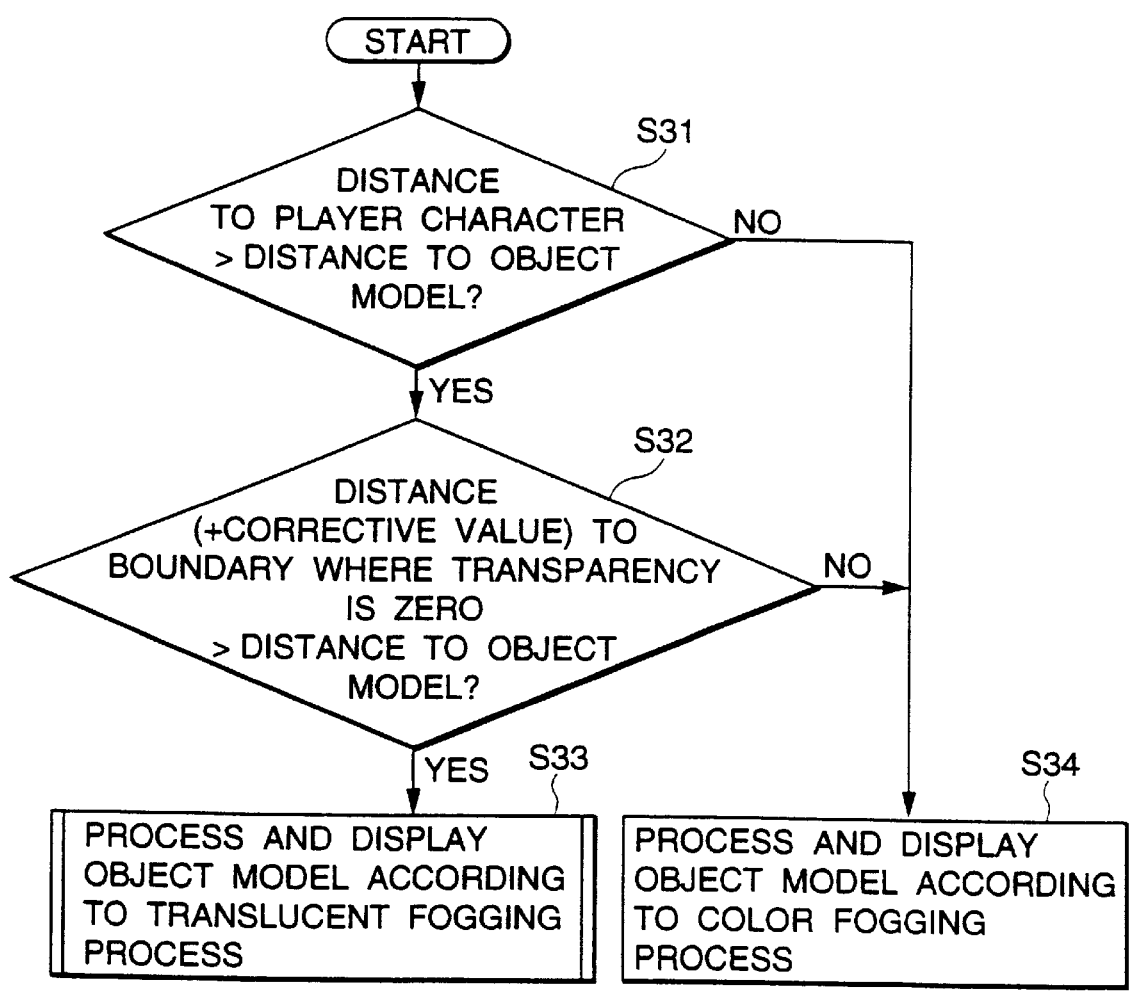
FIG. 11 is a flowchart of a routine for switching between a translucent fogging process and an ordinary fogging process (color fogging process) according to a second embodiment of the present invention.

FIG. 11 shows a specific routine for switching between the translucent fogging process and the color fogging process.

As shown in FIG. 11, the CPU 6 decides whether the player character controlled by the game player is positioned farther than an object model from the viewpoint of the hypothetical camera or not in step S31. If the player character is positioned farther than the object model from the viewpoint of the hypothetical camera, then the CPU 6 decides whether the object model is positioned farther than the boundary NEAR (see FIG. 4) from the viewpoint of the hypothetical camera and located within the transparency control range P or not in step S32. If the object model is positioned farther than the boundary NEAR from the viewpoint of the hypothetical camera and located within the transparency control range P, then the object model is processed and displayed on the display screen 2$a$ according to the translucent fogging process in step S33.

If the player character is positioned closer to the object model from the viewpoint of the hypothetical camera (NO in step S31), or if the object model is positioned farther than the boundary FAR (see FIG. 4) from the viewpoint of the hypothetical camera (NO in step S32), then the object model is processed and displayed on the display screen 2$a$ according to the color fogging process in step S34. The actual distance up to the boundary FAR includes a certain corrective value.

While the transparency controller 30 can be implemented by a hardware arrangement, the transparency controller 30 can also be software-implemented to calculate a transparency level for an object model based on the distance between the viewpoint of the hypothetical camera and the object model and to change the transparency of the object model based on the calculated transparency. If the functions of the transparency controller 30 are software-implemented, however, the CPU 6 suffers an increased burden, and relatively large object models that are processed and displayed look somewhat unnatural because the transparency of each object model is uniform. If the functions of the transparency controller 30 are hardware-implemented, as described above, the transparency control process can be performed with less calculations, and the transparency can be changed in not only each polygon surface, but also each pixel in a polygon surface. As a result, the transparency of an object model can be changed naturally even when the viewpoint of the hypothetical camera moves quickly.

Furthermore, a large object model, e.g., an object model which extends over a game character from a position in front of the game character to a position behind the game character, is not uniformly made either translucent or opaque. Instead, the portion of the object model behind the game character is made opaque, and the portion of the object model in front of the game character is made substantially continuously translucent, allowing the game player to see the game character for performing the video game.

The transparency controller 30 as hardware-implemented is capable of effecting the transparency control process on each pixel of an object model because each pixel has a distance z from the viewpoint of the hypothetical camera. However, the transparency controller 30 as software-implemented needs to perform the transparency control process on each pixel of an object model with a high-speed microcomputer for achieving a desired processing speed. Alternatively, it is possible to achieve a desired processing speed by calculating only vertexes of each polygon and interpolating pixels from the calculated vertexes.

According to the transparency control process described above, shapes and colors of back surfaces of object models that are three-dimensionally made translucent pixel by pixel can be displayed, though not processed in the illustrated embodiments. When shapes and colors of back surfaces of object models are displayed, the object models are expressed more realistically on the display screen 2a, allowing the game player to obtain visual information of game characters more accurately.

The video game apparatus according to the present invention may be in the form of an arcade game machine, a home game machine, or a general personal computer. If the video game apparatus is in the form of an arcade game machine, then the manual controller 17 has a joystick and various switches including shooting switches, and the image display unit 19 has the television monitor 2 such as a dedicated CRT or liquid display unit and a projection display screen. If the video game apparatus is in the form of a home game machine, then the manual controller 17 has a cross key and various control buttons, and the controller 23 is incorporated in the home game machine, with a television set used as the image display unit 19. If the video game apparatus is in the form of a personal computer, then the manual controller 17 comprises a keyboard and a mouse, and the image display unit 19 comprises a graphic display unit, with the controller 23 being incorporated in the personal computer.

If the video game apparatus is in the form of a home game machine or a personal computer, then the game program is stored in a computer-readable game program storage medium such as a floppy disk, a CD-ROM, a magnetooptical disk, a DVD-ROM, or the like, can be read into the home game machine or the personal computer by a reader.

Although certain preferred embodiments of the present invention have been shown and described in detail, it should be understood that various changes and modifications may be made therein without departing from the scope of the appended claims.

What is claimed is:

1. A video game apparatus for playing a video game in a game image displayed on a display screen and including a game character movable in a pseudo-three-dimensional space containing an object model, comprising:
   translucent information storage means for storing transparency levels of pixels of an object model which correspond to distances from the viewpoint of a hypothetical camera which is capturing an image of a game character, to the respective pixels of the object model, said transparency levels being higher as said distances are smaller; and
   transparency control means for determining distances from the viewpoint of the hypothetical camera to pixels of an object model as an obstacle behind which said game character is concealed as viewed from the viewpoint of the hypothetical camera, determining transparency levels corresponding to the determined distances, respectively, from said translucent information storage means, generating image data of the pixels of the object model as the obstacle based on the determined trans-parency levels, and combining the generated image data with image data of said game character.

2. A video game apparatus according to claim 1, wherein said game character comprises a pair of competitive characters, further comprising hypothetical camera viewpoint moving means for reducing the distance from said viewpoint of the hypothetical camera to said competitive characters as the distance between the competitive characters is reduced.

3. A video game apparatus according to claim 2, further comprising control means for moving the viewpoint of the hypothetical camera depending on the movement of the competitive characters in order to view the competitive characters laterally at all times.

4. A video game apparatus according to claim 1, wherein said transparency control means comprises:
   distance extracting means for determining the distances from the viewpoint of the hypothetical camera to the pixels of the object model;
   transparency extracting means for obtaining the transparency levels corresponding to the determined distances, respectively, from said translucent information storage means; and
   image data processing means for generating the image data of the pixels of the object model as the obstacle based on the obtained transparency levels, and combining the generated image data with image data of said game character.

5. A video game apparatus according to claim 4, wherein said game character comprises a pair of competitive characters, further comprising hypothetical camera viewpoint moving means for reducing the distance from said viewpoint of the hypothetical camera to said competitive characters as the distance between the competitive characters is reduced.

6. A video game apparatus according to claim 5, further comprising control means for moving the viewpoint of the hypothetical camera depending on the movement of the competitive characters in order to view the competitive characters laterally at all times.

7. A video game apparatus according to claim 1, wherein said translucent information storage means comprises:
   means for storing object models to be processed for transparency control; and
   means for storing the transparency levels of the pixels of the object model which correspond to the distances from the viewpoint of the hypothetical camera which is capturing the image of the game character, to the respective pixels of the object model, said transparency levels being higher as said distances are smaller, and wherein said transparency control means comprises:
   distance extracting means for determining the distances from the viewpoint of the hypothetical camera to the pixels of the object model;
   transparency extracting means for obtaining the transparency levels corresponding to the determined distances, respectively, from said translucent information storage means; and
   image data processing means for generating the image data of the pixels of the object model as the obstacle based on the obtained transparency levels, and combining the generated image data with image data of said game character.

8. A video game apparatus according to claim 7, wherein said game character comprises a pair of competitive characters, further comprising hypothetical camera viewpoint moving means for reducing the distance from said viewpoint of the hypothetical camera to said competitive characters as the distance between the competitive characters is reduced.

9. A video game apparatus according to claim 8, further comprising control means for moving the viewpoint of the hypothetical camera depending on the movement of the competitive characters in order to view the competitive characters laterally at all times.

10. A video game apparatus for playing a video game in a game image displayed on a display screen and including a game character movable in a pseudo-three-dimensional space containing an object model, comprising:

translucent information storage means for storing transparency levels of pixels of an object model which correspond to distances from the viewpoint of a hypothetical camera which is capturing an image of a game character, to the respective pixels of the object model, said transparency levels being higher as said distances are smaller; and transparency control means for determining distances from the viewpoint of the hypothetical camera to pixels of an object model if the object model is positioned closer than said game character to the viewpoint of the hypothetical camera, determining transparency levels corresponding to the determined distances, respectively, from said translucent information storage means, generating image data of the pixels of the object model as the obstacle based on the determined transparency levels, combining the generated image data with image data of said game character, and fogging a color of the object model if the object model is positioned farther than said game character from the viewpoint of the hypothetical camera.

11. A video game apparatus according to claim 10, wherein said game character comprises a pair of competitive characters, further comprising hypothetical camera viewpoint moving means for reducing the distance from said viewpoint of the hypothetical camera to said competitive characters as the distance between the competitive characters is reduced.

12. A video game apparatus according to claim 11, further comprising control means for moving the viewpoint of the hypothetical camera depending on the movement of the competitive characters in order to view the competitive characters laterally at all times.

13. A video game apparatus according to claim 10, wherein said transparency control means comprises:

distance extracting means for determining the distances from the viewpoint of the hypothetical camera to the pixels of the object model positioned closer than said game character to the viewpoint of the hypothetical camera;

transparency extracting means for obtaining the transparency levels corresponding to the determined distances, respectively, from said translucent information storage means; and image data processing means for generating the image data of the pixels of the object model based on the obtained transparency levels, and combining the generated image data with image data of said game character.

14. A video game apparatus according to claim 13, wherein said game character comprises a pair of competitive characters, further comprising hypothetical camera viewpoint moving means for reducing the distance from said viewpoint of the hypothetical camera to said competitive characters as the distance between the competitive characters is reduced.

15. A video game apparatus according to claim 14, further comprising control means for moving the viewpoint of the hypothetical camera depending on the movement of the competitive characters in order to view the competitive characters laterally at all times.

16. A video game apparatus according to claim 10, wherein said translucent information storage means comprises:

means for storing object models to be processed for transparency control; and means for storing the transparency levels of the pixels of the object model which correspond to the distances from the viewpoint of the hypothetical camera which is capturing the image of the game character, to the respective pixels of the object model positioned closer than said game character to the viewpoint of the hypothetical camera, said transparency levels being higher as said distances are smaller, and wherein said transparency control means comprises:

distance extracting means for determining the distances from the viewpoint of the hypothetical camera to the pixels of the object model positioned closer than said game character to the viewpoint of the hypothetical camera;

transparency extracting means for obtaining the transparency levels corresponding to the determined distances, respectively, from said translucent information storage means; and image data processing means for generating the image data of the pixels of the object model based on the obtained transparency levels, and combining the generated image data with image data of said game character.

17. A video game apparatus according to claim 16, wherein said game character comprises a pair of competitive characters, further comprising hypothetical camera viewpoint moving means for reducing the distance from said viewpoint of the hypothetical camera to said competitive characters as the distance between the competitive characters is reduced.

18. A video game apparatus according to claim 17, further comprising control means for moving the viewpoint of the hypothetical camera depending on the movement of the competitive characters in order to view the competitive characters laterally at all times.

19. A method of processing a game image displayed on a display screen and including a game character movable in a pseudo-three-dimensional space containing an object model, comprising the steps of:

determining distances from the viewpoint of a hypothetical camera which is capturing an image of a game character to pixels of an object model as an obstacle behind which said game character is concealed as viewed from the viewpoint of the hypothetical camera;

determining transparency levels corresponding to the determined distances, respectively, from a transparency information table, said transparency levels being higher as said distances are smaller;

generating image data of the pixels of the object model based on the determined transparency levels; and combining the generated image data with image data of said game character.

20. A method according to claim 19, further comprising the step of:

moving the viewpoint of the hypothetical camera depending on the movement of the competitive characters in order to view the competitive characters laterally at all times.

21. A method of processing a game image displayed on a display screen and including a game character movable in a pseudo-three-dimensional space containing an object model, comprising the steps of:

determining distances from the viewpoint of a hypothetical camera which is capturing an image of a game character to pixels of an object model if the object model is positioned closer than said game character to the viewpoint of the hypothetical camera;

determining transparency levels corresponding to the determined distances, respectively, from a transparency information table, said transparency levels being higher as said distances are smaller;

generating image data of the pixels of the object model based on the determined transparency levels;

combining the generated image data with image data of said game character; and fogging a color of the object model if the object model is positioned farther than said game character from the viewpoint of the hypothetical camera.

22. A method according to claim 21, further comprising the step of:

moving the viewpoint of the hypothetical camera depending on the movement of the competitive characters in order to view the competitive characters laterally at all times.

23. A computer-readable recording medium storing a control program for playing a video game in a game image displayed on a display screen and including a game character movable in a pseudo-three-dimensional space containing an object model, said control program comprising the steps of:

identifying an object model as an obstacle behind which a game character is concealed as viewed from the viewpoint of a hypothetical camera which is capturing an image of the game character;

determining distances from the viewpoint of the hypothetical camera pixels of said object model;

determining transparency levels corresponding to the determined distances, respectively, from a transparency information table, said transparency levels being higher as said distances are smaller;

generating image data of the pixels of the object model based on the determined transparency levels; and combining the generated image data with image data of said game character.

24. A computer-readable recording medium according to claim 23, further comprising the step of:

moving the viewpoint of the hypothetical camera depending on the movement of the competitive characters in order to view the competitive characters laterally at all times.

25. A computer-readable recording medium storing a control program for playing a video game in a game image displayed on a display screen and including a game character movable in a pseudo-three-dimensional space containing an object model, said control program comprising the steps of:

determining distances from the viewpoint of a hypothetical camera which is capturing an image of a game character to pixels of an object model if the object model is positioned closer than said game character to the viewpoint of the hypothetical camera;

determining transparency levels corresponding to the determined distances, respectively, from a transparency information table, said transparency levels being higher as said distances are smaller;

generating image data of the pixels of the object model based on the determined transparency levels;

combining the generated image data with image data of said game character; and fogging a color of the object model if the object model is positioned farther than said game character from the viewpoint of the hypothetical camera.

26. A computer-readable recording medium according to claim 25, further comprising the step of:

moving the viewpoint of the hypothetical camera depending on the movement of the competitive characters in order to view the competitive characters laterally at all times.

27. A video game in which a game image is displayed on a display screen and includes a game character movable in a pseudo-three-dimensional space containing an object model, comprising:

translucent information storage apparatus for storing transparency levels of pixels of an object model which correspond to distances of the object model from the viewpoint of a hypothetical camera, which is capturing an image of a game character, to the respective pixels of the object model, said transparency levels being higher as said distances are smaller; and transparency control apparatus for determining distances from the viewpoint of the hypothetical camera to pixels of the object model when the object model is positioned closer than said game character to the viewpoint of the hypothetical camera, determining transparency levels corresponding to the determined distances, respectively, from said translucent information storage apparatus, generating image data of the pixels of the object model based on the determined transparency levels, combining the generated image data with image data of said game character, and fogging the color of the object model when the object model is positioned farther than said game character from the viewpoint of the hypothetical camera.

28. A video game according to claim 27, wherein said transparency control apparatus comprises:

distance extracting apparatus for determining distances from the viewpoint of the hypothetical camera to the pixels of the object model positioned closer than said game character to the viewpoint of the hypothetical camera;

transparency extracting apparatus for obtaining transparency levels corresponding to the determined distances, respectively, from said translucent information storage apparatus; and image data processing apparatus for generating the image data of the pixels of the object model based on the obtained transparency levels, and combining the generated image data with image data of said game character.

29. A video game according to claim 27, wherein said translucent information storage apparatus comprises:

apparatus for storing object models to be processed for transparency control;

apparatus for storing transparency levels of the pixels of the object model which correspond to the distances from the viewpoint of the hypothetical camera, which is capturing the image of the game character, to the respective pixels of the object model positioned closer than said game character to the viewpoint of the hypothetical camera, said transparency levels being higher as said distances are smaller, and wherein said transparency control apparatus comprises:

distance extracting apparatus for determining distances from the viewpoint of the hypothetical camera to the pixels of the object model positioned closer than said game character to the viewpoint of the hypothetical camera;

transparency extracting apparatus for obtaining transparency levels corresponding to the determined distances, respectively, from said translucent information storage apparatus; and image data processing apparatus for generating image data of the pixels of the object model based on the obtained transparency levels, and combining the generated image data with image data of said game character.

30. A video game according to claim 27, wherein said game character comprises a pair of competitive characters, further comprising hypothetical camera viewpoint moving apparatus for reducing the distance from said viewpoint of the hypothetical camera to said competitive characters as the distance between the competitive characters is reduced.

31. A video game according to claim 30, wherein said transparency control apparatus comprises:

distance extracting apparatus for determining the distances from the viewpoint of the hypothetical camera to the pixels of the object model based on the distance reduced by said hypothetical camera viewpoint moving apparatus.

32. A video game according to claim 30, further comprising control apparatus for moving the viewpoint of the hypothetical camera depending on the movement of the competitive characters in order to provide for sustained lateral viewing of the competitive characters.

33. A video game in which a display screen displays a pseudo-three-dimensional image of a game character and an object model as viewed from the viewpoint of a hypothetical camera comprising:

image actuating apparatus for changing the image displayed on a display screen corresponding to the distance between the game character and said viewpoint; and transparency control apparatus for changing the degree of transparency of at least parts of the image displayed on the display screen depending on the distance of the object model from said viewpoint.

34. A video game according to claim 33 wherein said transparency control apparatus controls the degree of transparency of said parts of the image depending on the distance of the pixels of the object model from said viewpoint.

35. A video game according to claim 33 wherein said transparency control apparatus controls the degree of transparency of individual pixels of the object model depending on the distance of said pixels of the object model from said viewpoint.

36. A video game according to claim 33 wherein said image actuating apparatus is operable to position the image of the game character at a plurality of distances from said viewpoint, said transparency control apparatus operating over a plurality of states between a maximum transparency state and a minimum transparency state, said transparency control apparatus being at said maximum transparency state when the image of the game character is at a first distance from said viewpoint, said transparency control apparatus being at said minimum transparency state when the image of the game character is at a second distance from the viewpoint, said second distance being greater than said first distance.

37. A video game according to claim 36 wherein said transparency control apparatus operates over a plurality of intermediate degrees of transparency between said maximum transparency state and said minimum transparency state, the intermediate degree of transparency progressively increasing from said minimum transparency state to said maximum transparency state.

38. A video game according to claim 36 wherein the degree of transparency progressively increases from said minimum transparency state to said maximum transparency state as the distance between the object model and said viewpoint decreases.

39. A video game according to claim 36 wherein the degree of transparency progressively decreases from said minimum transparency state to said maximum transparent state as the distance between the pixels of the object model and said viewpoint decreases.

40. A video game according to claim 33 wherein said image actuating apparatus includes a game player-operated device enabling a game player to change the image on the display screen corresponding to the distance between the game character and said viewpoint.

41. A video game according to claim 33 wherein said display screen displays plural game characters, said image actuating apparatus being player-operated by a game player such that the game player can vary the distance between the plural game characters displayed on the display screen, said image actuating apparatus changing the distance between the plural game characters and said viewpoint as the game player changes the distance between the two plural game characters displayed on the display screen.

42. A video game according to claim 33 wherein said transparency control apparatus changes the degree of transparency of the object model when the game character is at a distance further from said viewpoint than said object model and said object model is in a position which would otherwise obscure said game character.

43. A player-operated game according to claim 33 wherein at least said object model is displayed in color, said transparency control apparatus effecting fogging of the color of the object model when the object model is further away from said viewpoint than said game character.

44. A player-operated game according to claim 43 wherein said transparency control apparatus effects different levels of fogging of the color of the object model depending on the distance of the object model from said viewpoint.

45. A video game comprising:

a display screen displaying a pseudo-three-dimensional image of a game character and an object model as viewed from the viewpoint of a hypothetical camera;

image actuating apparatus for changing the image displayed on the display screen corresponding to the distance between the displayed game character and said viewpoint; and transparency control apparatus for changing the degree of transparency of parts of the image displayed in the screen depending on the distance of the object model from said viewpoint.

46. A video game according to claim 45 wherein said display screen displays plural game characters, said image actuating apparatus being operated by a game player such that the game player can move the game characters displayed on the display screen, said image actuating apparatus changing the viewpoint of the hypothetical camera depending on the movement of the game characters displayed on the display screen to sustain lateral positioning of the game characters displayed on the display screen.

47. A video game in which a display screen displays at least a partially colored pseudo-three-dimensional image which includes a game character and an object model as viewed from the viewpoint of a hypothetical camera comprising:

image actuating apparatus for changing the image displayed on a display screen corresponding to the distance between the game character and said viewpoint; and transparency control apparatus for changing the degree of fogging of the color of at least parts of the object model depending on the distance that the object model exceeds being further away from said viewpoint than the game character.

48. A video game in which a pseudo-three-dimensional game image is displayed on a display screen and includes at least one game character as viewed from the viewpoint of a hypothetical camera and at least one object model as viewed from the viewpoint of the hypothetical camera comprising:

translucent information storage apparatus for storing transparency levels of pixels of the object model which correspond to distances from the viewpoint of the hypothetical camera, which is capturing an image of the game character, to the respective pixels of the object model; and transparency control apparatus for determining distances from the viewpoint of the hypothetical camera to pixels of the object model for determining transparency levels corresponding to the determined distances, respectively, from said translucent information storage means, and for generating image data of the pixels of the object model based on the determined transparency levels.

49. A video game apparatus according to claim 48 wherein said at least one game character comprises a pair of competitive characters, further comprising hypothetical camera viewpoint moving apparatus for reducing the distance from said viewpoint of the hypothetical camera to said competitive characters as the distance between the competitive characters is reduced.

50. A video game apparatus according to claim 48 further comprising control apparatus for moving the viewpoint of the hypothetical camera depending on the movement of the competitive characters in order to sustain viewing the competitive characters laterally.

51. A method of operating a video game having a display screen comprising:

displaying on a display screen a pseudo-three-dimensional image of a game character and an object model as viewed from the viewpoint of a hypothetical camera;

controlling the pseudo-three-dimensional image to change the image corresponding to the distance between the game character and said viewpoint; and varying the transparency level of parts of the image depending on the distance of the object model from said viewpoint.

52. A method according to claim 51 wherein said varying step comprises changing the transparency level of parts of the image depending on the distance of the pixels of the object model from the said viewpoint.

53. A method according to claim 51 wherein said varying step comprises changing the transparency level of at least parts of said object model depending on the distance of the pixels of said at least parts of said object model from said viewpoint.

54. A method according to claim 51 wherein said controlling step comprises changing the game character image over a plurality of distances from said viewpoint, and said varying step comprises varying the transparency level over a plurality of states between a maximum transparency state and a minimum transparency state in which the transparency level is at said maximum transparency state wherein said game character is at a first distance from said viewpoint and the transparency level is at said minimum transparency state when said game character is at a second distance from said viewpoint with said second distance being greater than said first distance.

55. A method according to claim 54 wherein said varying step comprises varying the transparency level over a plurality of intermediate transparency states representing different levels of transparency between said maximum transparency state and said minimum transparency state.

56. A method according to claim 54 wherein said varying step comprises progressively increasing the transparency level from said minimum transparency state to said maximum transparency state.

* * * * *